March 2, 1943.                D. J. MURNANE                2,312,667
                            SAFETY GLASS SETTING
                            Filed Aug. 21, 1940
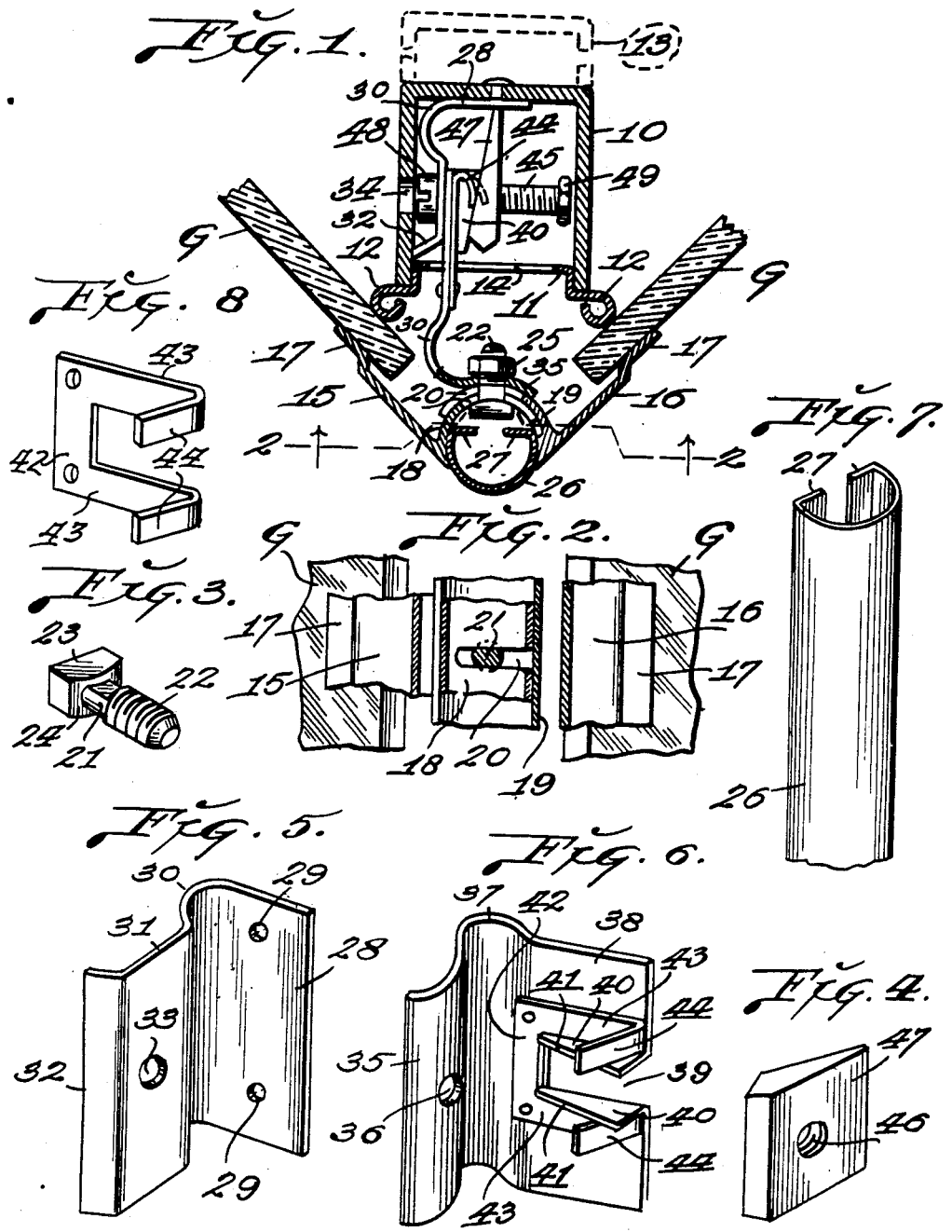
INVENTOR:—
DANIEL J. MURNANE.
By Martin P. Smith
                    ATTY.

Patented Mar. 2, 1943

2,312,667

UNITED STATES PATENT OFFICE 2,312,667

SAFETY GLASS SETTING

Daniel J. Murnane, Hollywood, Calif.; Grace E. Murnane and Gertrude D. Murnane administratrices of said Daniel J. Murnane, deceased Application August 21, 1940, Serial No. 353,535

2 Claims. (Cl. 189—78)

My invention relates generally to metallic glass settings for store fronts and other type of plate glass windows and particularly to corner bar settings.

The primary object of my invention is, to provide glass settings through which uniform preselected pressure can be automatically applied on glass when locking the outside member of the setting to the inside member by non-glass pressure locking means.

Other objects and advantages of my invention will become apparent as the description proceeds, reference being had to the accompanying drawing in which:

Fig. 1 is a horizontal section of a corner bar glass setting constructed in accordance with my invention.

Fig. 2 is a vertical cross section taken on the line 2—2 of Fig. 1.

Fig. 3 is a perspective view of a bolt utilized for connecting the adjustable members that contact the external faces of the plates of glass.

Fig. 4 is a perspective view of the wedge-shaped nut that is engaged by the threaded shank of the bolt or screw that forms a part of the means for locking the glass setting members to each other.

Fig. 5 is a perspective view of the resilient connecting bracket that is positioned within the inner member of the setting.

Fig. 6 is a perspective view of the bracket that is connected to the outer members of the setting and which cooperates adjustably with the bracket positioned within the inner member.

Fig. 7 is a perspective view of a resilient tubular-shaped filler member that is positioned between the adjustably connected parts of the outer member of the setting.

Fig. 8 is a perspective view of the spring that is associated with the non-glass pressure locking devices, portions of which spring are bent at a predetermined angle in order that they may act to automatically draw the outside glass setting member into uniform pre-selected contact with the glass when the locking devices are actuated to lock the members of the setting to each other.

Referring by numerals to the accompanying drawing, 10 designates a bar, preferably formed of metal and channel-shaped in cross section, and positioned against the ends of the parallel flanges of this bar is the inner one 11 of the glass contacting members, the same being preferably formed of metal and provided on its vertical edges with beads 12 which make direct contact with the inner faces of plates of glass G.

It is to be understood that the members 10 and 11 may be of any practical length and where utilized for the larger and heavier sizes of plate glass, the bar 10 may be reinforced with a second chanel-shaped bar 13 that may be connected to the inner end portion of bar 10 in any suitable manner.

Formed in the intermediate portion of member 11 between the flanges of bar 10 are openings 14, the same being suitably spaced apart lengthwise of said member and which openings are for the accommodation of the connecting brackets and the locking means therefor.

The outer glass contacting member is formed in two parts, designated by the numerals 15 and 16, and the sides of these members terminate in inset flanges 17 which make direct contact with the plates of glass G, preferably at points on said glass opposite from the beads 12 of member 11.

Formed integral with the vertical edge of member 15 opposite the edge provided with the contact flange 17 is a flange 18, arcuate in cross section with its concave face outwardly presented, and formed integral with the corresponding vertical edge of member 16 is a flange 19, arcuate in cross section and which overlies flange 18 on member 15.

In order that the glass contacting members 15 and 16 may be adjusted into varying angular positions, the flanges 18 and 19 are provided with horizontally disposed slots 20, each slot being open at the free edge of the flange and which slots coincide with each other for the reception of the square or non-circular portion 21 that is formed on the shank of a bolt 22 and the head 23 of the bolt being provided with a transversely curved under face 24 adjacent the non-circular portion 21 of the shank so that said curved face will conform to the curvature of flange 19 when the parts are assembled. The threaded shank of this bolt receives a nut 25 (see Fig. 1).

To provide close fitting joints between the flanged end of the members 15 and 16, a filler tube 26 preferably formed of thin, resilient metal, semi-circular in cross section is positioned between the adjacent inner vertical edges of members 15 and 16, and projecting inwardly toward each other from the edges of the curved body portion of this filler are flanges 27 which serve to reinforce and stiffen the filler.

When the parts 15 and 16 are assembled, the sides of this filler including the flanges 27 are positioned against the curved faces of the flanges 18 and 19 and the filler thus positioned provides the desired finish for the outwardly presented corner of the setting and conforms to the angular adjustment of members 15 and 16.

Owing to the arrangement of the flanges 18 and 19 on the plates 15 and 16 and the circular contour of such flanges, the filler 27 is maintained in its position between the inner portions of the plates 15 and 16 without the requirement for screws or other fastening means.

The means utilized for connecting the bar 10 with the outer part of the setting including the members 15 and 16 comprises a pair of cooperating brackets, preferably formed of metal having a certain degree of resiliency, and these members are illustrated in Figs. 5 and 6.

The bracket member that is positioned within and secured to the channel-shaped bar 10 comprises a flat plate 28 that is positioned directly against the inner face of the web of bar 10 and being secured thereto in any suitable manner, preferably by means of rivets that pass through apertures 29 in said plate. One side of plate 28 is connected by a curved portion of metal 30 to a plate 31 that is disposed substantially at right angles to the plate 28 and which, when the bracket is secured to member 10, occupies a position parallel with and spaced apart from one of the flanges of bar 10. The free edge of the plate 31 terminates in an outwardly presented inclined flange 32.

Formed through the central portion of plate 31 is an aperture 33 for the reception of a locking screw and formed through the adjacent flange of bar 10 in alignment with the aperture 33 is an aperture 34 for the accommodation of a screw driver that is utilized in manipulating the screw through which the setting members are locked.

The connecting bracket illustrated in Fig. 6 is formed from a single piece of shaped resilient metal and a portion 35 at one side thereof is curved to conform to the curved external face of flange 19 on member 16. Formed in the center of this curved portion 35 is an aperture 36 for the reception of the shank of bolt 22 and when the parts 15 and 16 have been properly adjusted and the bracket of which the curved portion 35 is a part, is properly associated with the bracket arranged within the bar 10, nut 25 is tightened on the bolt 22 to lock the various parts in proper assembled relation.

From the inner edge of the curved side portion 35, the metal forming the outer one of the brackets is bent to form a portion 37 that is channel-shaped in cross section and from this portion the remaining portion of the metal forming the bracket is extended in a plane substantially at right angles to that occupied by the curved side portion 35, thereby providing a flat plate 38 that lies directly against the inner face of the flat portion 31 of the bracket that is positioned within bar 10.

Formed in the intermediate portion of plate 38 and extending from its free edge inwardly toward curved part 37 is a horizontally disposed slot 39 for the accommodation of the screw that locks the brackets to each other and formed on the parallel edges of this slot and projecting at right angles to the plane occupied by plate 38 are flanges 40 provided with inclined edges 41.

Secured to the portion 37 of this bracket is the inner end portion of a horizontally disposed plate 42 of spring metal and that portion of this plate that lies against plate 38 is cut away for the accommodation of the flanges 40, thereby forming a pair of spring strips 43 that extend across the plate 38 immediately adjacent the flanges 40. The end portions of these spring strips 43 are rebent to form inclined resilient fingers 44 that extend across and beyond the flanges 40, and in angular relation with respect to the strips 43 (see Fig. 6).

The threaded shank of a screw or bolt 45 passes through aperture 33, through the slot 39, and through a threaded aperture 46 that is formed in a non-rotating wedge-shaped nut 47 and one of the angular faces of this nut rests directly upon the inclined edges 41 of wedge-shaped flanges 40. The head 48 of this screw occupies a position against the outer face of plate 31 so that the slot in said head may be readily engaged by the bit of a screw driver inserted through aperture 34 and mounted on the end of the shank of this screw is a nut or flange 49 that functions as a stop to prevent the nut from being run off the screw 45 in the event that the same should be overrotated.

The thin end of the non-rotating wedge-shaped nut 47 contacts and slides against the flat plate portion 28 of the bracket that is secured to bar 10.

When the parts of the setting are assembled as illustrated in Fig. 1 with plates of glass positioned between the contact members 12, 15 and 17, screw 45 is manipulated by means of a screw driver inserted through aperture 34 and thus, the non-rotating wedge-shaped nut 47 is brought into contact with and pressed against the free ends of the springs 44 which, as shown by dotted lines in Fig. 1, normally project beyond the inclined edges of the flanges 40, the inclination of which springs conforms to the inclined surface of the nut 47 that contacts the springs, and as such action is continued the pressure developed imparts drawing action to the bracket to which the springs are connected and such action results in the application of pre-selected contact of the glass contacting members with the glass. This drawing action ceases when the inclined face of nut 47 makes contact with the beveled edges of the flanges 40 and when such condition exists, the free ends of the springs 44 have been moved so that their outer ends lie flush with the beveled edges of the flanges 40 as illustrated by solid lines in Fig. 1. At this time the parts of the setting are securely locked to each other with pre-selected pressure on the glass by the glass contacting members. The locking devices per se can not exert any pressure on the glass.

As the non-rotating nut is drawn onto the beveled edges of the flanges 40, the overlapping portions of the brackets are positively locked to each other so as to provide the desired connection between the bar 10 and the outer members 15 and 16. The slotting of the overlapping curved flanges 18 and 19 enables the outer members 15 and 16 to be adjusted into different angular positions and the bolt 22 and nut 25 serve to lock the parts 15 and 16 in their adjusted positions and to firmly secure the outer one of the brackets to said adjustable outer members.

In some instances, bracket members 28, 31, and 32 may be dispensed with and in such event, plate 38 of the bracket that is connected to glass contacting members 15 and 16 is extended into and suitably connected to bar 10 and the headed end of screw 45 passes through one of the flanges of said bar.

Thus it will be seen that I have provided a safety glass setting that is relatively simple in construction, inexpensive of manufacture, capable of being readily assembled or taken apart, and which is very effective in performing its intended functions, namely, an adjustable cushioned and resilient mounting for the plates of glass utilized in the construction of store fronts, windows, show cases, and other glazed structures, and for applying pre-selected uniform contact on the glass so as to minimize the possibility of breakage thereof when subjected to wind pressures or vibration.

It will be understood that minor changes in the size, form and construction of the various parts of my improved safety glass setting, may be made and substituted for those herein shown and described, without departing from the spirit of my invention, the scope of which is set forth in the appended claims, for instance, the springs that are effective in developing pre-selected uniform pressure might be associated with the adjustable nut instead of being mounted on the connecting brackets.

I claim as my invention:

1. In a corner bar glass setting, an inner glass contacting member, an outer glass contacting member comprising two parts capable of adjustment for engagement with plates of glass positioned at different angles, overlapping flanges formed on the inner faces of the parts of said outer member adjacent their inner edges, which flanges are shaped to provide a recess between said parts, a bolt passing through said flanges for securing the same to each other, the head of which bolt bears against the face of that one of the flanges that forms a part of the wall of said recess and a substantially semi-circular resilient member positioned within said recess independent of said bolt and its head whereby said resilient member may be rotated for a limited distance in either direction and moved lengthwise while the glass setting is being assembled or disassembled.

2. A corner bar glass setting as set forth in claim 1 and with integral flanges projecting toward each other from the edges of said semi-circular resilient member.

DANIEL J. MURNANE.